United States Patent [19]

Tsuruta

[11] 3,805,864
[45] Apr. 23, 1974

[54] HEAT RADIATION TIRE
[76] Inventor: Yasuo Tsuruta, No. 1004/Omori Sanno-Rihaimu, 19-15, 1-chome, Sanno Ota-ku, Tokyo, Japan
[22] Filed: July 19, 1972
[21] Appl. No.: 273,112

[30] Foreign Application Priority Data
Nov. 22, 1971 Japan.................. 46-093091

[52] U.S. Cl................... 152/153, 152/330
[51] Int. Cl............................ B60c 19/06
[58] Field of Search...... 152/153, 202, 330 R, 354, 152/151, 330

[56] References Cited
UNITED STATES PATENTS
2,475,199   7/1949   Reynolds ................. 152/354
1,034,847   8/1912   Viel ....................... 152/202
1,457,892   6/1923   Blackwelder ............ 152/153
2,948,321   8/1960   Mote ..................... 152/330
3,515,195   6/1970   Sperberg ................ 152/330

Primary Examiner—Drayton E. Hoffman
Attorney, Agent, or Firm—Steinberg & Blake

[57] ABSTRACT

A heat radiation tire, characterized in that a plurality of spikes of good thermal conductivity project out of the surface of a tire cover, and the spikes are connected to a metal wire or band mounted in said tire cover, in order to dissipate heat due to friction between the tire and ground to the atmosphere immediately.

9 Claims, 3 Drawing Figures

HEAT RADIATION TIRE

SUMMARY OF THE PRESENT INVENTION

The present invention relates to a heat radiation tire. It is a principal object of the present invention to prevent an accident by dissipating heat due to friction between the frictional surface of a tire and the ground to the atmosphere in order to avoid the wear of the rubber frictional surface of a tire, especially upon the landing of an aircraft and the like.

DETAILED EXPLANATION OF THE PRESENT INVENTION

It is a main object of the present invention to prevent local temperature rise of the tire, by conducting heat caused by friction between the tire and the ground to a wire or band, hereinafter simply called a band, of good thermal conductivity mounted in a tire cover in order to dissipate the heat to the atmosphere and thereby local temperature rise of the tire is prevented.

In the past, a tire was principally made from rubber having very poor thermal conductivity (about $1.6 \times 10^{-3}$ W/cm. deg). Therefore, when great braking force is required, frictional heat caused at part of the tire being in contact with the ground is not dissipated. For this reason, the temperature of part of the tire in contact with the ground rises suddenly. When a tire bears heavy load, part of tire in contact with the ground often breaks. When many aircraft make landings and takeoffs one after another continuously, the tires of the landing gears of the aircraft are apt to break at the part which comes in contact with the ground. Moreover, the break of the tire may cause serious accidents.

Figure 1:
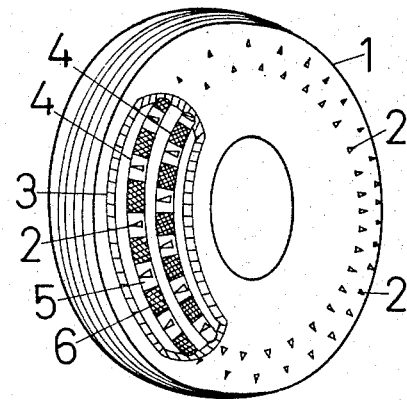
FIG. 1 is a perspective view of the internal construction of part of a tire which embodies the construction of the present invention.

It is the object of the present invention to prevent temperature rise of part of the tire, such as part of the tire which comes in contact with the ground, by conducting friction heat of the surface of the tire part in contact with the ground to other parts of the tire, and radiating such heat into the atmosphere. The following are an embodiment of the present invention applied to a tire having lateral tread. As shown in FIG. 1, the spikes 2 to be used for instantaneous braking project out of the tire cover 3 of the tire 1, the spikes being made from material of high thermal conductivity such as metal alloy, emery, etc. In addition, the spikes 2 are connected to the metal band 4 mounted in the tire cover 3. It is preferable that the metal band 4 should consist of the metal plate 5 and the metal net 6 in order not to affect the flexibility of the tire 1 and in order to make the spikes 2 as stable as possible.

Figure 2:
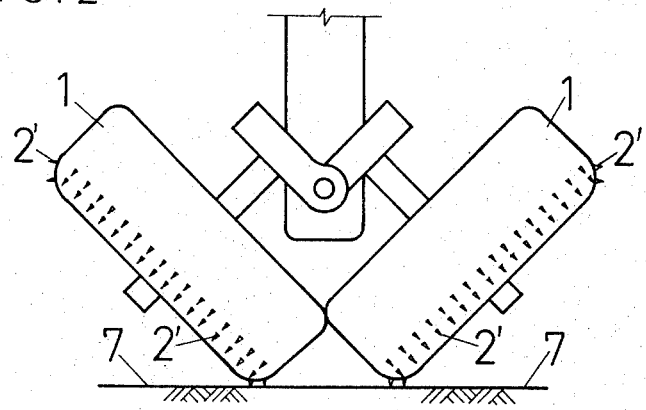
FIG. 2 is an elevational view of the tire according to the present invention, when a brake is applied to the tire.

As shown in FIG. 2, when the tire 1 is made to incline to bring the spikes 2 in contact with the ground in order to apply brake to the tire 1 by preventing the rotation thereof, thermal energy generated between the surface of the tire or the spikes 2' which comes in contact with the ground and the ground surface 7 does not remain at the surface of the tire in contact with the ground, in contrast with conventional tires. The thermal energy is not only dispersed to other parts of the tire than the part in contact with ground by means of the spikes 2 and the metal band 4, but is also radiated into the air by means of spikes 2' mounted on other parts than the part in contact with the ground. Therefore, the thermal gradient among the spikes 2 and the metal band 4 and the spikes 2' is always kept great, because thermal energy generated at part of tire being in contact with the ground is radiated quickly into the air. For this reason, abnormal temperature rise of part of tire 1 in contact with the ground due to friction with the ground can be completely prevented, when a brake force is applied to the tire.

In order to radiate effectively thermal energy generated in the tire 1 into the air when the tire is running at a high speed, the metal band 10 (FIG. 3) is embedded in the concave groove 11' formed on the surface of the cover 11 of the tire 8, so as to be exposed at the tire surface, and the spikes 9 are connected to the band 12 of high thermal conductivity. The band 12 is in turn connected to the rim 13 with heat radiating ribs 14. In this way, the thermal energy generated in the tire is effectively conducted to the ribs 14 through the spikes 9, the metal band 10, the band 12, the rim 13, and finally, is effectively radiated into the air. Since the rim 13 and the ribs 14 always come in contact with the air while running, thermal gradient between the spikes 9 or the metal band 10 and the band 12, the rim 13 and the ribs 14 is always kept somewhat great. Accordingly, thermal energy generated in the tire 8 is effectively radiated into the air, and temperature rise of the tire 8 is prevented very efficiently.

Figure 3:
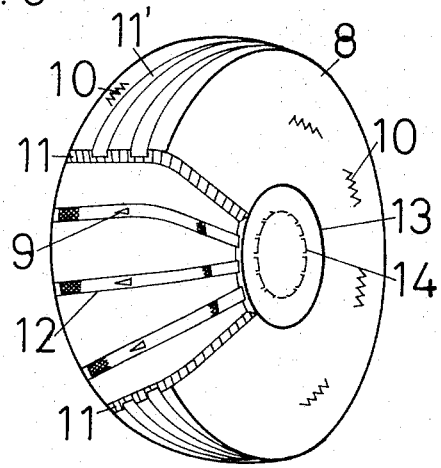
FIG. 3 is a perspective view of the tire according to the present invention.

When thermal energy is conducted through the metal bands 4 and 12, the metal plate 5, the metal net 6, etc. mounted in the tire covers 3 and 11 of the tire shown in FIG. 1 and FIG. 3, these elements themselves were heated to high temperatures. Therefore, there is possibility that the tire covers 3 and 11 which are in contact with the elements are affected by said high temperatures. For this reason, it is preferable to imbed the metal bands 4 and 12, and the metal plate 5, the metal net 6, etc. in the tire covers 3 and 11 of the tire, after the surfaces of said elements are covered with heat resistance material such as asbestos, glass fiber and the like. In addition, it is also desirable to cover part of spikes 2, 2' and 9 and the metal band 10 etc. in the tire cover with heat resistance material.

Thus it will be seen that with the structure of the invention the tire wall hss a surface which normally engages the ground during operation aaaaass of the tire, and at this latter surface of the tire wall there are exposed elements of good thermal conductivity for engaging the ground, these elements of good thermal conductivity also being in engagement with heat-transfer means of good thermal conductivity embedded in the tire wall so that through this heat-transfer means the friction is distributed through the tire wall. The elements of good thermal conductivity which are exposed at the tire surface which engages the ground may take the form of spikes or the metal elements 10, and the internal heat-transfer means is in the form of a band having alternating sections of metal and mesh as described above, these bands extending radially in the embodiment of FIG. 3 and circumferentially in the embodiment of FIGS. 1 and 2. In the case where the internal heat-transfer means is in the form of separate radial bands as shown in FIG. 3, these bands also are connected with the rim 13 of good thermal conductivity, this rim being provided with the heat-radiating ribs 14 as described above.

I claim:

1. In a tire, a tire wall having an outer circumferentially extending surface which normally engages the ground during operation of the tire, said tire wall carrying at said surface thereof exposed elements of good thermal conductivity which are also circumferentially distributed at said surface, and said wall having embedded therein and circumferentially distributed therethrough a heat-transfer means of good thermal conductivity which is in engagement with said elements of good thermal conductivity so that through said heat-transfer means frictional heat at said tire surface is distributed around the tire wall and is radiated to the outer atmosphere.

2. The combination of claim 1 and wherein said elements of good thermal conductivity are in the form of spikes.

3. The combination of claim 1 and wherein said elements of good thermal conductivity are in the form of elongated metal elements carried by the tire wall and exposed at said surface thereof.

4. The combination of claim 1 and wherein said heat-transfer means includes elongated bands of good thermal conductivity embedded in the tire wall.

5. The combination of claim 4 and wherein said bands are each composed of alternating sections of metal and mesh.

6. The combination of claim 4 and wherein said bands extend circumferentially along the interior of the tire wall.

7. The combination of claim 4 and wherein said bands are circumferentially distributed and include a plurality of band portions respectively situated in radial planes which pass through the tire wall.

8. The combination of claim 7 and wherein said wall carries a central rim of good thermal conductivity connected with said bands in said radial planes.

9. The combination of claim 8 and wherein said rim carries heat-radiating ribs exposed at the exterior of said rim.

* * * * *